United States Patent Office 3,645,900
Patented Feb. 29, 1972

3,645,900
ELECTRO-INSULATING VARNISHES
Klaus Ohm and Joseph Weder, Offenbach am Main, Germany, assignors to Schramm Lack- und Farbenfabriken Aktiengesellschaft, Offenbach am Main, Germany
No Drawing. Filed Sept. 16, 1968, Ser. No. 762,378
Claims priority, application Germany, Sept. 21, 1967,
P 16 69 046.3
Int. Cl. H01b 3/30; B44d 1/42
U.S. Cl. 252—63.7
18 Claims

ABSTRACT OF THE DISCLOSURE

Electro-insulating stoving varnish made by condensing itaconic acid or an ester of itaconic acid with a monoamino or diamino compound.

---

This invention relates to electro-insulating varnishes.

For the production of heat-resistant enamelled wires there are used varnishes based on condensation products of aromatic polycarboxylic acids, especially terephthalic acid, isophthalic acid or trimellitic acid, with aromatic diamines, especially diamino-diphenylmethane, and/or polyhydric alcohols, especially ethylene glycol, glycerol, tris-(2-hydroxyethyl)-isocyanurate, said condensation products being dissolved in cresols.

Enamelled wires of an even higher thermal stability are obtained with highly viscous varnishes based on polycondensation products which contain hydantoin rings, and with varnishes based on condensation products of pyromellitic acid or trimellitic acid with polynuclear aromatic diamines, dissolved in solvents of the type of dimethylacetamide or N-methyl-pyrrolidone.

The thermal stability of the enamelled wires of the first-mentioned group is frequently not sufficient to meet the high demands of modern electro-engineering. In particular, the softening temperature and/or the resistance to thermal shock are not high enough.

The varnishes for wires of the second group give difficulty in processing, due to their high viscosity or their poor stability in storage. Furthermore, the varnishes must, in general, be run more slowly than those of the first group. A further disadvantage of the varnishes lies in their comparatively difficult production, since they are produced in several stages or the condensation processes are carried out in solvents.

It is an object of the invention to provide an electro-insulating varnish which makes it possible to produce enamelled wires having, at the same time, high thermal stability, high resistance to thermal shock, a high softening point, good mechanical resistance and stability to solvents; which, furthermore, is easily prepared from readily accessible raw materials; and which, moreover, can be worked up safely and rapidly in the usual wire-enamelling machines with nozzles as well as with felt strippers.

There has now been found a wire varnish of a novel chemical type, which, to a very high degree, offers a solution to the problem.

According to the invention, electro-insulating stoving varnishes comprise polycondensates which contain pyrrolidone rings substituted on the nitrogen atom, or which form such rings in the course of stoving.

The polycondensates of the present invention may be produced by simple processes. For example, they may be produced by reacting itaconic acid or its isomers or derivatives with bifunctional or trifunctional especially aromatic, heterocyclic or cycloaliphatic amino compounds.

The following reaction scheme illustrates such a process:

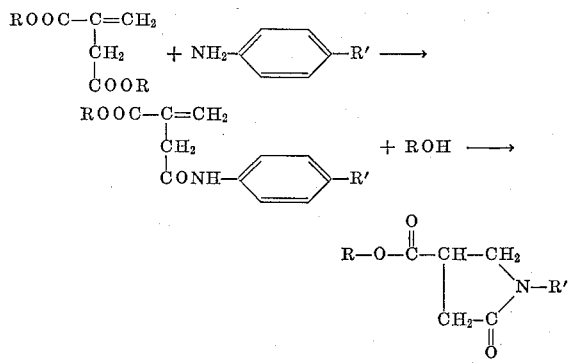

wherein —COOR is a carboxyl or an ester group and R' is —NH₂, —COOH,

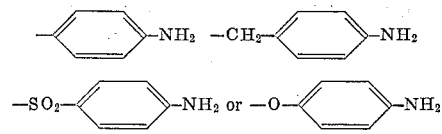

For example, 1 mole of itaconic acid or its derivatives, especially its esters, are heated with 0.4 to 2.4 moles of aromatic monoamino compounds or with 0.2 to 1.2 moles of diamino compounds at temperatures above the melting point of the mixture, or above the boiling point of the alcohol used if itaconic acid is the starting material. In general, heating is carried out at 150 to 270° C. until the desired degree of condensation is attained. The condensation process can also be carried out by heating the starting materials dissolved in the solvent, e.g. cresol or N-methyl-pyrrolidone.

Suitable esters of itaconic acid are the mono- or diesters with monohydric alcohols, e.g. butanol, or compounds with dihydric alcohols, e.g. ethylene glycol, p,p'-dihydroxy-dicyclohexyl-propane or neopentyl glycol, or compounds with trihydric or higher alcohols, e.g. glycerol, trimethylolpropane, pentaerythritol or tris-(2-hydroxyethyl)-isocyanurate.

Examples of aromatic, heterocyclic or cycloaliphatic amino compounds which can be used according to the invention are:

p-phenylene-diamine, benzidine, p-aminobenzoic acid,
p,p'-diamino-diphenyl-methane, p,p'-diamino-diphenyl-sulphone,
p,p'-diamino-diphenyl ether, melamine, benzoguanamine,
1-amino-3-aminomethyl-3,5,5-trimethylcyclohexane,
p,p'-diamino-dicyclohexyl-methane.

Variation of the properties can be achieved by the following modifications:

The itaconic acid or its derivatives can be replaced in part with other dicarboxylic acids, such as terephthalic acid or isophthalic acid, or with trimellitic acid or pyromellitic acid. A replacement of up to about 30 molar percent is sometimes of advantage for improving certain technical properties of the varnish, for example, the running properties.

A replacement of up to about 60 molar percent, for example, leads to terephthalic acid polyester varnishes which are substantially improved in respect of their resistance to thermal shock, due to the incorporated pyrrolidone rings.

The aromatic or heterocyclic amino compounds can be replaced in part (up to about 40 molar percent) with aliphatic diamines, e.g. hexamethylene-diamine or trimethylhexamethylene-diamine.

The resin according to the invention is soluble, for example, in phenols, such as cresol or xylenol, or in dimethyl formamide, dimethyl acetamide, N-methyl-pyrrolidone, isophorone or dimethyl sulphoxide.

A combination with terephthalic acid polyesters, isophthalic acid polyesters, ester-imide resins, phenol, resins, epoxide resins or polyhydantoin resins, is feasible and may be advantageous for improving the properties.

Solderable varnishes can be improved in respect of their thermal stability, especially their resistance to thermal shock, by the addition of up to about 50% of the resins according to the invention.

To improve the curing speed during stoving of the varnish, it is advisable to add hardeners and/or catalysts, e.g. butyl titanate, zinc or zirconium compounds or stabilised polyisocyanates, to the varnish.

The varnishes according to the invention are not only suitable for the production of enamelled wires; they can also be used as impregnating varnish or for the production of electro-insulating materials.

The following examples are given for the purpose of illustrating the invention.

EXAMPLE 1

260 parts by weight (2 moles) itaconic acid are esterified with 240 parts by weight (4 moles) ethylene glycol at a temperature of 180° to 190° C., until an acid number of about 100 is reached. 198 parts by weight (1 mole) p,p'-diamino-diphenyl-methane are then added and the temperature is slowly raised to 230° C. The temperature of about 230° C. is then maintained until the desired viscosity has been achieved; this takes about 6 hours. The ethylene glycol is distilled off during the reaction. The condensation product is subsequently dissolved in a mixture of cresol and solvent naphtha (mixing ratio 2:1) to give a 30% by weight solution, the viscosity of the 30% by weight solution amounting to 900 cp. at 20° C. 0.5% butyl titanate are added to the finished 30% by weight solution.

A copper wire of 0.5 mm. diameter can be enamelled on a horizontal enamelling machine with catalytic waste gas combustion and a shaft length of 2.5 m. at a rate of 24 m./min. with the use of felt strippers. The copper wire so obtained has an elasticity of the insulation of 80%, a thermal shock of 1 times the diameter at 250° C., a softening temperature of the varnish insulation of 350° C., and a pencil hardness of 5 H (measured according to DIN 46,453, October 1966).

EXAMPLE 2

260 parts by weight (2 moles) itaconic acid are esterified with 186 parts by weight (3 moles) ethylene glycol and 130 parts by weight (0.5 mole) tris-(2-hydroxyethyl)-isocyanurate, as in Example 1. 198 parts by weight (1 mole) p,p'-diamino-diphenyl-methane are then added and the procedure of Example 1 is subsequently followed. To the 30% by weight solution there are finally added 1.5% butyl titanate.

EXAMPLE 3

260 parts by weight (2 moles) itaconic acid and 194 parts by weight (1 mole) terephthalic acid dimethyl ester are esterified with 372 parts by weight (6 moles) ethylene glycol at 180° C. When an acid number below about 100 is reached, there are added 198 parts by weight (1 mole) p,p'-diamino-diphenyl-methane, and the temperature is slowly raised to 220 to 230° C., part of the ethylene glycol being distilled off. The temperature is maintained until the desired viscosity has been achieved. The condensation product is readily soluble in a mixture of cresol and solvent naphtha in the ratio 2:1. The viscosity of the 30% by weight solution amounts to 850 cp. at 20° C. 0.8% butyl zirconate are added to the solution.

EXAMPLE 4

260 parts by weight (2 moles) itaconic acid are esterified with 186 parts by weight (3 moles) ethylene glycol and 104 parts by weight (1 mole) neopentyl glycol, as in Example 2. 198 parts by weight (1 mole) p,p'-diamino-diphenyl-methane are then added and the procedure of Example 1 is followed. A copper wire of 0.5 mm. diameter is enamelled with this varnish in a varnishing device in six passages.

There is obtained an enamelled wire of high thermal stability, good resistance to abrasion, high stability to solvents and a softening temperature of 340° C. The thermal shock of 1 times the diameter, 30 min., 280° C. is satisfactory.

EXAMPLE 5

260 parts by weight (2 moles) itaconic acid are esterified with 124 parts by weight (2 moles) ethylene glycol and 296 parts by weight (4 moles) butanol, as in Example 1. 297 parts by weight (1.5 moles) p,p'-diamino-diphenyl ether are then added, the temperature is slowly raised to 240° C. and this temperature is maintained until the desired degree of condensation has been achieved. Part of the butanol and ethylene glycol are distilled off. The polycondensate is subsequently dissolved in cresol and 1% by weight butyl titanate is added.

EXAMPLE 6

260 parts by weight (2 moles) itaconic acid are esterified with 124 parts by weight (2 moles) ethylene glycol and 134 parts by weight trimethylol-propane, as in Example 1, and 198 parts by weight (1 mole) p,p'-diamino-diphenyl-methane are subsequently added, and heating is continued as in Example 1. The condensate is dissolved in a mixture of cresol and solvent naphtha in the ratio 2:1. The viscosity amounts to 1100 cp. at 20° C. 0.3% by weight zinc octoate are added.

EXAMPLE 7

To 1000 parts by weight of the solution of Example 6 there are added 400 parts by weight of a 50% by weight cresol solution of a blocked cyclic trimer of toluylene diisocyanate. The resultant solution is adjusted to a solids content of 30% by weight with the aid of a solvent mixture comprising cresol and solvent naphtha in the ratio 2:1.

A copper wire enamelled with this material has a good thermal shock, great hardness and stability to solvents.

EXAMPLE 8

500 parts by weight of the varnish solution of Example 1 are mixed with 500 parts by weight of a 30% by weight terephthalic acid polyester varnish. A copper wire of 0.5 mm. diameter enamelled with this varnish has a thermal shock of 220° C. (1 times the diameter, 30 min.), an abrasion resistance of 55, good stability to solvents and a softening temperature of 300° C.

EXAMPLE 9

130 parts by weight (1 mole) itaconic acid are esterified with 124 parts by weight (2 moles) ethylene glycol at 180° C., as in Example 1, and subsequently reacted with 99 parts by weight (0.5 mole) p,p'-diamino-diphenyl-methane at 220° C. for 1 hour. When the reaction is completed, 291 parts by weight (1.5 moles) terephthalic acid dimethyl ester, 124 parts by weight (2 moles) ethylene glycol and 92 parts by weight glycerol (1 mole) are added and after the addition of 0.5 part by weight PbO, the whole mixture is condensed, first at 180° C. for 1 hour and subsequently at 230° C. for 6 hours. The viscosity of a 30% by weight solution in cresol amounts to 870 cp. at 20° C.

EXAMPLE 10

130 parts by weight (1 mole) itaconic acid are dissolved in 960 parts by weight N-methyl-pyrrolidone at 120° C., 99 parts by weight (0.5 mole) p,p'-diamino-diphenyl-methane and 85 parts by weight (0.5 mole) 1-amino-3-aminomethyl-3,5,5 - trimethyl-cyclohexane are added, and the whole mixture is condensed at 180° C. for 6 hours. The resultant 30% by weight solution has a viscosity of 1,200 cp. at 20° C. 0.5% by weight butyl titanate are added to the finished varnish.

A copper wire of 0.5 mm. diameter is enamelled with this varnish in six passages. The copper wire thus obtained has a high elasticity of the varnish film, good resistance to abrasion and a softening temperature of 310° C.

EXAMPLE 11

Propylene-glycol-(1,2) is used as bifunctional alcohol in the same manner as in Example 1.

After diluting with cresol to a solids content of 30% by weight, a copper wire of 0.7 mm. diameter is enamelled. The resultant enamelled wire has a hardness of 5 H. The hardness of 5 H is maintained even after the action of ethanol at 60° C. for 30 minutes. The enamelled copper wire also has an elasticity of the insulation of 75% and a softening temperature of 340° C.

EXAMPLE 12

130 parts by weight (1 mole) itaconic acid are esterified with 124 parts by weight (2 moles) ethylene glycol at 180° C. 54.5 parts by weight (0.5 mole) p-phenylenediamine and 68.6 parts by weight (0.5 mole) p-aminobenzoic acid are then added and the temperature is slowly raised to 220° to 340° C. This temperature is maintained for 5 hours and the condensation product is dissolved in dimethyl formamide to give a 30% by weight solution. 0.5% by weight cadmium acetate are added to the solution.

A copper wire of 1 mm. diameter is enamelled with this varnish in known manner. The copper wire has a very good elasticity, a hardness of 5 H and a softening temperature of 380° C.

EXAMPLE 13

In the same manner as in Example 11, benzoguanamine is used, instead of p,p'-diamino-diphenyl-methane.

The varnish is diluted with a mixture of cresol and solvent naphtha in the ratio 2:1 to a solids content of 30% by weight.

Enamelled copper wires produced with this material have a thermal shock of 250° C. (1 times diameter) and a softening temperature of 360° C.

EXAMPLE 14

400 parts by weight of a 30% by weight solution of a polycondensate containing amide and imide groups in cresol is added to 800 parts by weight of the solution of Example 11. The polycondensation product was prepared from 1 mole trimellitic acid anhydride, 3 moles ethylene glycol and 1.0 mole p,p'-diamino-diphenyl-methane, the trimellitic acid anhydride being first esterified with the glycol, followed, after the addition of p,p'-diamino-diphenyl-methane, by condensation with heating at about 230° C. for six hours.

EXAMPLE 15

A solution consisting of 120 parts by weight of an epoxide resin with an epoxide equivalent of about 1,000, dissolved in 280 parts by weight of a mixture of cresol and solvent naphtha in the ratio of 2:1, is added to 800 parts by weight of the solution of Example 4.

Copper wires which are enamelled with this solution are highly elastic. By using epoxide resins with an epoxide equivalent of 500 to 10,000, a great number of combinations can be achieved with regard to the elasticity of the varnish layer.

EXAMPLE 16

A glass fabric is impregnated with the solution of Example 10 and subsequently dried in an oven at 120° to 150° C. for 30 minutes. Several fabrics of the same kind are placed one on top of the other and hardening is performed under pressure at a temperature of 200° to 220° C. The pressure is slowly increased and should finally amount to about 100 kg./sq. cm. A solid laminate is thus obtained, which is resistant to heat and has a good bending and impact strength.

EXAMPLE 17

The condensation product of Example 6 is dissolved in methyl glycol acetate to give a 40% by weight solution. To 1000 parts by weight of this solution there are added 480 parts by weight of 50% by weight solution of a blocked cyclic trimer of toluylene diisocyanate in methyl glycol acetate.

This varnish is suitable for the impregnation of windings. The impregnated windings are dried at 130° to 160° C. for about 8 to 10 hours.

EXAMPLE 18

A glass fabric is enamelled in known manner with the varnish solution of Example 17 and subsequently cured in a tunnel furnace with a shaft length of about 7 m. at a temperature of 280° to 290° C. and a passage speed of 2 m./min. There results an enamelled fabric of good electrical properties which are retained even after long storage in the hot.

What is claimed is:

1. An electro-insulating stoving varnish consisting essentially of a polycondensate of itaconic acid or an ester of itaconic acid with a monoamino or diamino compound selected from the group consisting of p-phenylenediamine, benzidine, p-aminobenzoic acid, p,p'-diamino-diphenylmethane, p,p'-diamino-diphenyl-sulphone, p,p'-diamino-diphenyl ether, melamine, benzoguanamine, 1-amino - 3 - aminomethyl-3,5,5-trimethylcyclohexane, and p,p' - diamino - dicyclohexyl - methane, said monoamine compound being employed in a ratio of 0.4 to 2.4 moles per mole of the itaconic acid or ester of itaconic acid, and said diamino compound being employed in a ratio of 0.2 to 1.2 moles per mole of the itaconic acid or ester of itaconic acid.

2. The varnish as claimed in claim 1 wherein said ester is an ester of itaconic acid and an alcohol selected from the group consisting of dihydric alcohols and trihydric alcohols.

3. The varnish as claimed in claim 1 wherein said ester is an ester of itaconic acid and an alcohol selected from the group consisting of butanol, ethylene glycol, p,p'-dihydroxy-dicyclohexyl-propane, neopentyl glycol, glycerol, trimethylolpropane, pentaerythritol, tris-(2-hydroxyethyl)-isocyanurate, and propylene glycol-(1,2).

4. The varnish as claimed in claim 3 wherein said alcohol is ethylene glycol, glycerol, or tris(2-hydroxyethyl)isocyanurate.

5. The varnish as claimed in claim 1 wherein said diamino compound is p,p'-diamino-diphenyl-methane or p,p'-diamino-diphenyl-ether.

6. The varnish as claimed in claim 1 further including a solvent selected from the group consisting of phenols, dimethyl formamide, dimethyl acetamide, N-methyl pyrrolidone, isophorone, solvent naphtha, methyl glycol acetate and dimethyl sulphoxide.

7. The varnish as claimed in claim 6 wherein said phenols are selected from the group consisting of cresol and xylenol.

8. The varnish as claimed in claim 1 further including a material for improving curing speed during stoving of the varnish which material is selected from the group consisting of butyl titanate, zinc compounds, zirconium compounds and stabilized polyisocyanates.

9. The varnish as claimed in claim 8 wherein said zinc compounds are zinc octoate, and said zirconium compounds are butyl zirconate.

10. The varnish as claimed in claim 1 further including lead oxide or cadmium acetate.

11. The varnish as claimed in claim 1 wherein up to about 30 molar percent of said itaconic acid or said ester of itaconic acid is replaced with an acid selected from the group consisting of dicarboxylic acids, trimellitic acid and pyromellitic acid to improve the running properties of the varnish.

12. The varnish as claimed in claim 11 wherein said dicarboxylic acids are terephthalic acid or isophthalic acid.

13. The varnish as claimed in claim 1 wherein up to about 60 molar percent of itaconic acid or the ester of itaconic acid is replaced with an acid selected from the group consisting of dicarboxylic acids, trimellitic acid and pyromellitic acid to improve the resistance of the varnish to thermal shock.

14. The varnish as claimed in claim 1 wherein said monoamino or diamino compound is selected from the group consisting of p-phenylene diamine, benzidine, p-aminobenzoic acid, p,p'-diamino-diphenyl methane, p,p'-diaminodiphenyl sulphone, p,p'-diamino-diphenyl ether, melamine and benzoguanamine, and up to about 40 molar percent of the monoamino or diamino compound is replaced with an aliphatic diamine.

15. The varnish as claimed in claim 14 wherein said aliphatic diamine is selected from the group consisting of hexamethylene diamine and trimethyl hexamethylene diamine.

16. The varnish as claimed in claim 1 further including a material selected from the group consisting of terephthalic acid polyesters, isophthalic acid polyesters, ester-imide resins, phenolic resins, epoxide resins and polyhydantoin resins.

17. A method of producing varnished wires comprising coating said wires with the composition of claim 1.

18. A method of treating coils or glass filament insulators comprising coating or impregnating said coils or filaments with the varnish of claim 1.

References Cited

UNITED STATES PATENTS

| | | | |
|---|---|---|---|
| 2,566,250 | 8/1951 | Reynolds et al. | 260—78 |
| 2,941,980 | 6/1960 | Robinson | 260—33.4 |
| 2,958,614 | 11/1960 | Perry | 117—126 |
| 3,006,900 | 10/1961 | Fikentscher et al. | 260—78 |
| 3,135,719 | 6/1964 | Taber | 260—78 |
| 3,212,927 | 10/1965 | Williams | 117—161 X |
| 3,355,458 | 11/1967 | Meigs et al. | 260—326.3 |
| 3,475,386 | 10/1969 | Meigs et al. | 260—78 |
| 3,479,327 | 11/1969 | Merijen et al. | 260—85.7 |
| 3,297,785 | 1/1967 | George et al. | 117—232 |
| 3,483,105 | 12/1969 | D'Alelio | 204—159.15 |

JOHN T. GOOLKASIAN, Primary Examiner

D. J. FRITSCH, Assistant Examiner

U.S. Cl. X.R.

117—229, 232, 126 GR, 128.4; 252—64; 260—30.2, 30.8 DS, 31.4, 32.6 N, 32.8 N, 33.4, 75 N, 75 UA, 78 P, 78 UA